(12) United States Patent
Gioscia et al.

(10) Patent No.: US 8,204,558 B2
(45) Date of Patent: *Jun. 19, 2012

(54) COMPACT PALMTOP COMPUTER SYSTEM AND WIRELESS TELEPHONE WITH FOLDABLE DUAL-SIDED DISPLAY

(75) Inventors: Rich Gioscia, Santa Clara, CA (US); Frank J. Canova, Jr., Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/266,041

(22) Filed: Nov. 6, 2008

(65) Prior Publication Data

US 2009/0061930 A1 Mar. 5, 2009

Related U.S. Application Data

(63) Continuation of application No. 11/011,514, filed on Dec. 13, 2004, now Pat. No. 7,466,961, which is a continuation of application No. 09/764,018, filed on Jan. 16, 2001, now Pat. No. 6,850,780.

(51) Int. Cl.
*H04B 1/38* (2006.01)
*H04M 1/00* (2006.01)

(52) U.S. Cl. .............. 455/575.1; 455/90.3; 455/566; 455/575.3

(58) Field of Classification Search ........... 455/90.3, 455/566, 575.1, 575.3; 379/433.04
See application file for complete search history.

(56) References Cited

U.S. PATENT DOCUMENTS

| | | | |
|---|---|---|---|
| 4,171,585 A | 10/1979 | Macuka | |
| 4,429,478 A | 2/1984 | Bruce-Sanders | |
| 5,351,843 A | 10/1994 | Wichman et al. | |
| 5,477,631 A | 12/1995 | Hewitt | |
| 5,510,809 A | 4/1996 | Sakai et al. | |
| 5,584,054 A | 12/1996 | Tyneski et al. | |
| 5,646,649 A | 7/1997 | Iwata et al. | |
| 5,696,982 A | 12/1997 | Tanigawa et al. | |
| 5,734,513 A | 3/1998 | Wang et al. | |
| 5,768,163 A | 6/1998 | Smith, II | |
| 5,797,089 A | 8/1998 | Nguyen | |
| 5,826,397 A | 10/1998 | Arnold | |
| 5,850,209 A | 12/1998 | Lemke et al. | |
| 5,896,575 A * | 4/1999 | Higginbotham et al. | 455/566 |
| 5,949,643 A | 9/1999 | Batio | |
| 5,983,073 A | 11/1999 | Ditzik | |
| 6,014,379 A | 1/2000 | White et al. | |
| 6,017,584 A | 1/2000 | Albert et al. | |
| 6,047,196 A | 4/2000 | Makela et al. | |
| 6,052,120 A | 4/2000 | Nahi et al. | |
| 6,057,814 A | 5/2000 | Kalt | |

(Continued)

FOREIGN PATENT DOCUMENTS

EP 0898223 2/1999

(Continued)

*Primary Examiner* — Simon Nguyen

(57) ABSTRACT

The present invention is a compact personal digital assistant (PDA) and cellular telephone with foldable dual-sided display. By utilizing flexible display technology, both a PDA and a cellular telephone are incorporated into one device. In a closed state, in one embodiment, the present invention corresponds to the form used for typical cellular telephone use (e.g., candy bar size). In an open state, in one embodiment, the present invention corresponds to the form used for typical PDA use by providing an enlarged viewing area. The present invention provides the benefit of two distinct devices in one device by allowing for common operations and functionality without compromising the respective form factor of either device.

17 Claims, 10 Drawing Sheets

U.S. PATENT DOCUMENTS

| | | | |
|---|---|---|---|
| 6,069,593 A | 5/2000 | Lebby et al. | |
| 6,084,584 A | 7/2000 | Nahi et al. | |
| 6,118,426 A | 9/2000 | Albert et al. | |
| 6,144,358 A * | 11/2000 | Narayanaswamy et al. | 345/102 |
| 6,185,589 B1 | 2/2001 | Votipka | |
| 6,229,502 B1 | 5/2001 | Schwab | |
| 6,252,564 B1 | 6/2001 | Albert et al. | |
| 6,259,932 B1 | 7/2001 | Constien | |
| 6,262,785 B1 | 7/2001 | Kim | |
| 6,297,945 B1 | 10/2001 | Yamamoto | |
| 6,304,763 B1 | 10/2001 | Jahagiradar et al. | |
| 6,311,042 B1 | 10/2001 | DeSchrijver | |
| 6,313,877 B1 | 11/2001 | Anderson | |
| 6,326,613 B1 | 12/2001 | Heslin et al. | |
| 6,327,482 B1 | 12/2001 | Miyashita | |
| 6,331,840 B1 | 12/2001 | Nielson et al. | |
| 6,340,006 B1 | 1/2002 | Malatto et al. | |
| 6,340,957 B1 | 1/2002 | Adler et al. | |
| 6,367,934 B1 | 4/2002 | Salesky et al. | |
| 6,389,267 B1 | 5/2002 | Imai | |
| 6,392,786 B1 | 5/2002 | Albert | |
| 6,393,272 B1 | 5/2002 | Cannon et al. | |
| 6,427,857 B1 | 8/2002 | Adams et al. | |
| 6,445,932 B1 | 9/2002 | Soini et al. | |
| 6,466,202 B1 * | 10/2002 | Suso et al. | 345/169 |
| 6,466,292 B1 * | 10/2002 | Kim | 349/143 |
| 6,487,396 B1 | 11/2002 | Sassi | |
| 6,526,296 B1 | 2/2003 | Nieminen | |
| 6,567,102 B2 | 5/2003 | Kung | |
| 6,570,583 B1 | 5/2003 | Kung et al. | |
| 6,577,496 B1 | 6/2003 | Gioscia et al. | |
| 6,628,962 B1 | 9/2003 | Katsura | |
| 6,662,244 B1 * | 12/2003 | Takahashi | 710/14 |
| 6,697,083 B1 * | 2/2004 | Yoon | 345/658 |
| 6,714,802 B1 | 3/2004 | Barvesten | |
| 6,747,609 B2 * | 6/2004 | Antila et al. | 345/1.1 |
| 6,748,243 B1 | 6/2004 | Kubo et al. | |
| 6,792,293 B1 * | 9/2004 | Awan et al. | 455/566 |
| 6,807,275 B1 | 10/2004 | Kubo et al. | |
| 6,952,599 B2 | 10/2005 | Noda et al. | |
| 7,289,083 B1 | 10/2007 | Canova, Jr. | |
| 2001/0003707 A1 * | 6/2001 | Moriya | 455/566 |
| 2002/0021258 A1 | 2/2002 | Koenig | |
| 2002/0021622 A1 | 2/2002 | Baroche | |
| 2003/0114200 A1 | 6/2003 | Lee | |
| 2004/0165060 A1 | 8/2004 | McNelley et al. | |

FOREIGN PATENT DOCUMENTS

| | | |
|---|---|---|
| WO | 0059179 | 10/2000 |
| WO | 0079372 | 12/2000 |
| WO | 0153919 | 7/2001 |

* cited by examiner

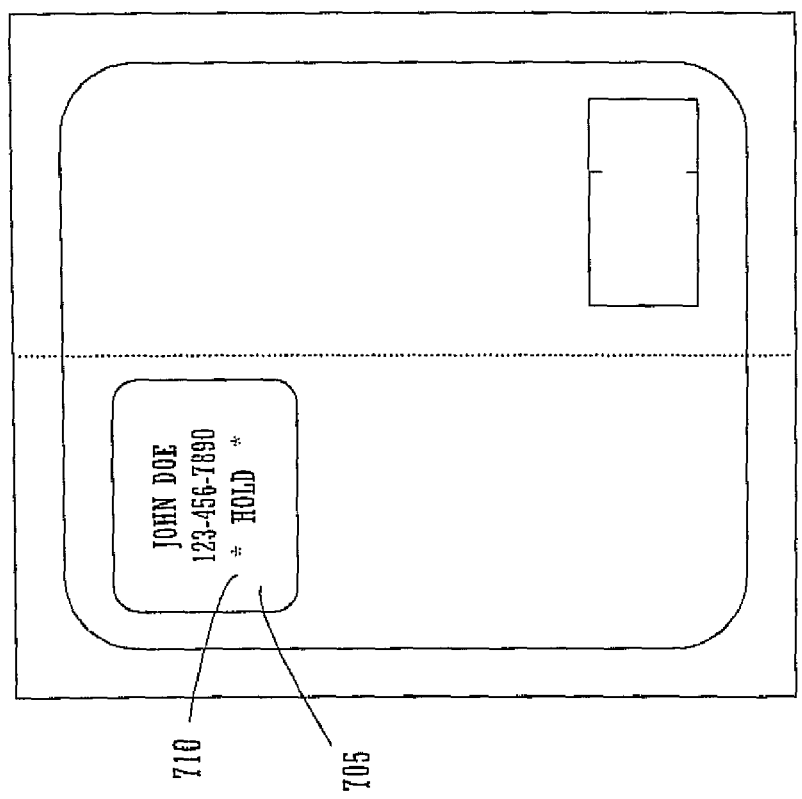

COMPACT PALMTOP COMPUTER SYSTEM AND WIRELESS TELEPHONE WITH FOLDABLE DUAL-SIDED DISPLAY

RELATED UNITED STATES PATENT APPLICATIONS

This application is a Continuation Application of the commonly-owned U.S. patent application with Ser. No. 11/011,514, filed Dec. 13, 2004, by R. Gioscia et al., and entitled "A Compact Palmtop Computer System and Wireless Telephone with Foldable Dual-Sided Display," now U.S. Pat. No. 7,466,961, which in turn is a Continuation Application of Ser. No. 09/764,018, now U.S. Pat. No. 6,850,780 filed Jan. 16, 2001.

FIELD OF INVENTION

The present invention relates to the field of portable electronic devices such as palmtop computer systems and cellular telephones. Specifically, the present invention relates to device combining palmtop computer system and cellular telephone technology.

BACKGROUND OF THE INVENTION

As the components required to build a computer system have reduced in size, new categories of computer systems have emerged. One of the more recent categories of computer systems is the portable or "palmtop" computer system, or personal digital assistant (PDA). A palmtop computer system is a computer that is small enough to be held in the hand of a user and is thus "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

The emergence of the cellular phone technology in the last few years has revolutionized the telecommunications industry. Where in the past telephones were largely confined to homes, offices, and other stationary structures, cellular phone technology has made it possible for phones to be truly portable and exist nearly anywhere there are people.

Recently, the technology behind both palmtop computer systems and cellular phones has advanced to the point where it is proposed to integrate cellular phone capabilities into a palmtop computer system. However, both types of devices possess different modes of operation. For example, palmtop computer systems are handheld devices providing primarily a visual experience while cell phones are held to the ear of a user and provide a primarily an auditory experience. Both types of devices possess different form factors to facilitate their respective usage, for example a cell phone is typically "candy bar" size while a palmtop computer device is typically flatter and wider than a cell phone.

As a result, users of the respective devices have grown accustom to the specific from factors of the respective devices. Cell phone users are hesitant to use a cell phone in the shape of a palmtop computer system as it is uncomfortable and awkward. Likewise, a typical cell phone display does not offer the size or interface that a palmtop computer system does. The users of palmtop computer systems and cell phones desire the benefits of each of the respective devices, and are unlikely to sacrifice these benefits if forced to compromise the form factor of the device.

SUMMARY OF THE INVENTION

Accordingly, what is needed is an electronic device that is both a palmtop computing system (e.g., a PDA) and a cell phone. Furthermore, a need exists for the above electronic device to possess the form factor of a palmtop computer system in one configuration and the form factor of a cell phone in another configuration. Also, a need exists for a device that provides the benefits of both a palmtop computer system and a cell phone in one device by allowing for common operations and functionality without compromising the respective form factor of either device.

The present invention is a compact palmtop computer system and cellular telephone with foldable dual-sided display. By utilizing flexible display technology, both a palmtop computer system and a cellular telephone are incorporated into one device having two effective form factors. In a closed state, in one embodiment, the screen is folded and the present invention corresponds to the form used for typical cellular telephone use (e.g., candy bar size). In an open state, in one embodiment, the present invention corresponds to the form used for typical palmtop computer system use by providing an enlarged viewing area and a user interface. The present invention provides the benefit of two distinct devices in one device by allowing for common operations and functionality without compromising the respective form factor of either device. By utilizing the benefit of a flexible dual-sided display, the user can obtain their information in either a closed or open position, or in this case, in a cell phone mode (e.g., closed) or a PDA mode (e.g., open).

In one embodiment, the present invention provides an electronic device comprising a first element and a second element. The first element is comprised of a first side and a second side. The first side bears an interface operable to be used as a wireless phone, and the second side comprises the first part of a display of a palmtop computer system. The second element is comprised of a third side and a fourth side. The third side comprises the second part of the display. The first element is movably attached with the second element. The present invention is configurable in a first configuration for use as a wireless phone and configurable in a second configuration for use as a palmtop computer system (e.g., a PDA).

In another embodiment the first configuration is a closed configuration wherein the second side and the third side face each other such that both the second side and the third side are not user accessible. In this embodiment only the first side and the fourth side are user accessible. The present embodiment provides the form factor of a typical cell phone (e.g., candy bar size).

In another embodiment, the second configuration is an open configuration wherein the second side and the third side are user accessible and fully visible as a complete display. The present embodiment provides the form factor of a typical palmtop computer system.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

FIG. 7a illustrates an exemplary display indicating wireless communications are on hold in a second configuration of an electronic device in accordance with an embodiment of the present invention.

DETAILED DESCRIPTION

In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Palmtop Computer System Platform

Figure 1:
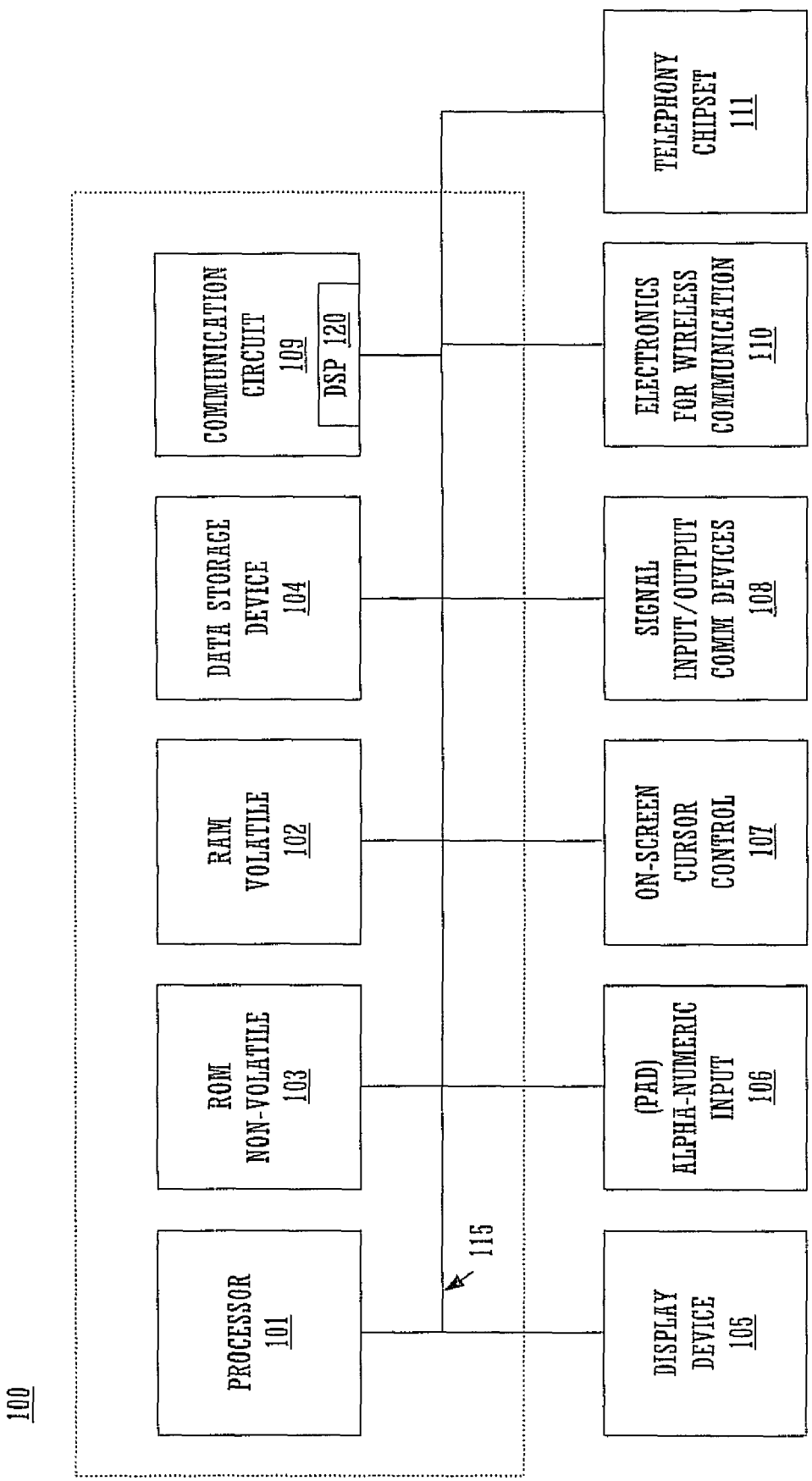
FIG. 1 is a block diagram of a portable computer system in accordance with an embodiment of the present invention.

FIG. 1 illustrates circuitry of exemplary computer system 100, some of which can be implemented on a PC board located inside a palmtop computer system. Computer system 100 includes an address/data bus 115 for communicating information, a central processor 101 coupled with the bus for processing information and instructions, a volatile memory 102 (e.g., random access memory, RAM) coupled with the bus 115 for storing information and instructions for the central processor 101 and a non-volatile memory 103 (e.g., read only memory, ROM) coupled with the bus 115 for storing static information and instructions for the processor 101. Computer system 100 also includes an optional data storage device 104 (e.g., memory stick) coupled with the bus 115 for storing information and instructions. Device 104 can be removable.

Computer system 100 also contains a display device 105 coupled to the bus 115 for displaying information to the computer user. In one embodiment, display device 105 is a flexible dual-sided display. In one embodiment, the flexible dual-sided display implements electronic ink technology.

The PC board can contain the processor 101, the bus 115, the ROM 103 and the RAM 102. Computer system 100 also includes a signal transmitter/receiver device 108, which is coupled to bus 115 for providing a physical communication link between computer system 100, and a network environment.

In one embodiment, computer system 100 includes a communication circuit 109 coupled to bus 115. Communication circuit 109 includes an optional digital signal processor (DSP) 120 for processing data to be transmitted or data that are received via signal transmitter/receiver device 108. Alternatively, processor 101 can perform some or all of the functions performed by DSP 120.

Also included in computer system 100 of FIG. 1 is an optional alphanumeric input device 106 that in one implementation is a handwriting recognition pad ("digitizer"). Alphanumeric input device 106 is a user interface device and can communicate information and command selections to processor 101. In one embodiment, alphanumeric input device 106 is incorporated into display device 105. In another embodiment, alphanumeric input device 106 is incorporated into display device 105 wherein display device 105 is a flexible dual-sided display.

Computer system 100 also includes an optional cursor control or directing device (on-screen cursor control 107) coupled to bus 115 for communicating user input information and command selections to processor 101. In one implementation, on-screen cursor control device 107 is a user interface device and is a touch screen device incorporated with display device 105. On-screen cursor control device 107 is capable of registering a position on display device 105 where the stylus makes contact. The display device 105 utilized with computer system 100 may be a flexible dual-sided display, a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flexible dual-sided display.

With reference still to FIG. 1, computer system 100 also includes wireless communication electronics 110, which is coupled with bus 115. In one embodiment, wireless communication electronics 110 comprises a microphone and a speaker.

In one embodiment, computer system 100 also includes a telephony chipset 111. Telephony chipset 111 enables computer system 100 to provide the functionality of a wireless phone (e.g., cellular phone) by providing the telephony functionality to transmit and receive cellular communications. In one embodiment, telephony chipset 111 is adapted to operate under the Global System for Mobile Communications (GSM) and the General Packet Radio Service (GPRS). GSM and GPRS are standards for wireless communications, and are common to the area of cellular communications. It should be appreciated that the present embodiment of telephony chipset 111 is well suited to be implemented in a wide variety of ways. For example, telephony chipset 111 operating under GSM/GPRS could be implemented as a modem.

Figure 2A:
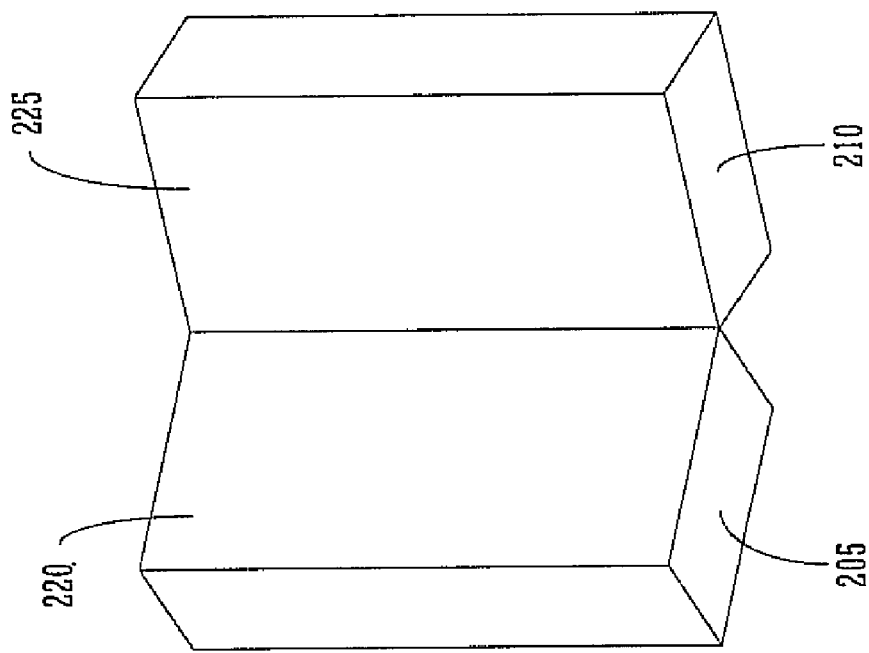
FIGS. 2a and 2b are perspective views of an electronic device in accordance with an embodiment of the present invention.
Figure 2B:
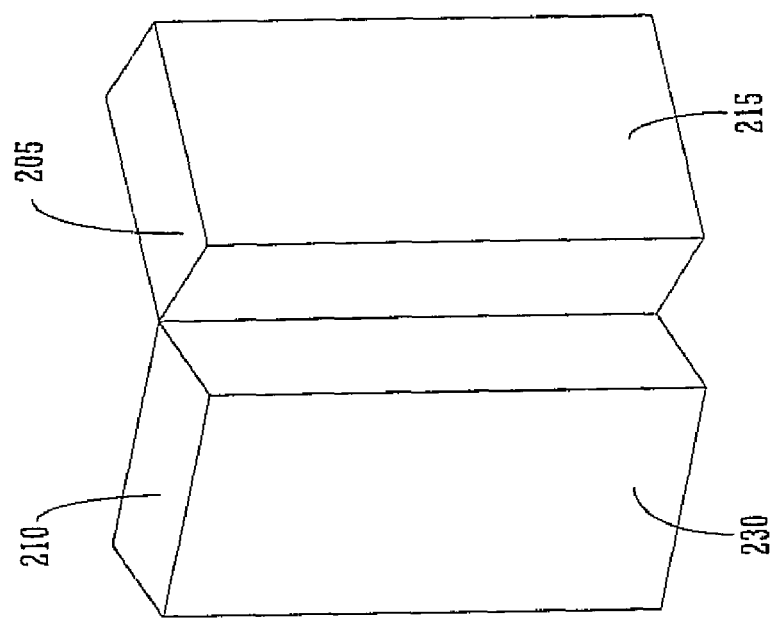

Compact Palmtop Computer System and Cellular Telephone with Foldable Dual-Sided Display FIGS. 2a and 2b are perspective views of an electronic device 200 in accordance with one embodiment of the present invention. Electronic device 200 is comprised of first element 205 and second element 210. First element 205 is movably attached to second element 210. First element 205 is comprised of first side 215 (FIG. 2b) and second side 220 (FIG. 2a). Second element 210 is comprised of third side 225 (FIG. 2a) and fourth side 230 (FIG. 2b).

It should be appreciated that, in one embodiment of the present invention, first element 205 and second element 210 comprise one housing. In the current embodiment, the housing is comprised of first surface 215 (FIG. 2*b*), second surface 220 (FIG. 2*a*), third surface 225 (FIG. 2*a*), and fourth surface 230 (FIG. 2*b*).

Electronic device 200 is operable in a first configuration and a second configuration. The first configuration (e.g., FIG. 3) is a closed configuration wherein second side 220 and said third side 225 face each other such that second side 220 and third 225 side are not user accessible. In the first configuration, first side 215 and fourth side 230 are user accessible. The second configuration (e.g., FIG. 4) is an open configuration wherein second side 220 and third side 225 are user accessible and fully visible.

Figure 3:
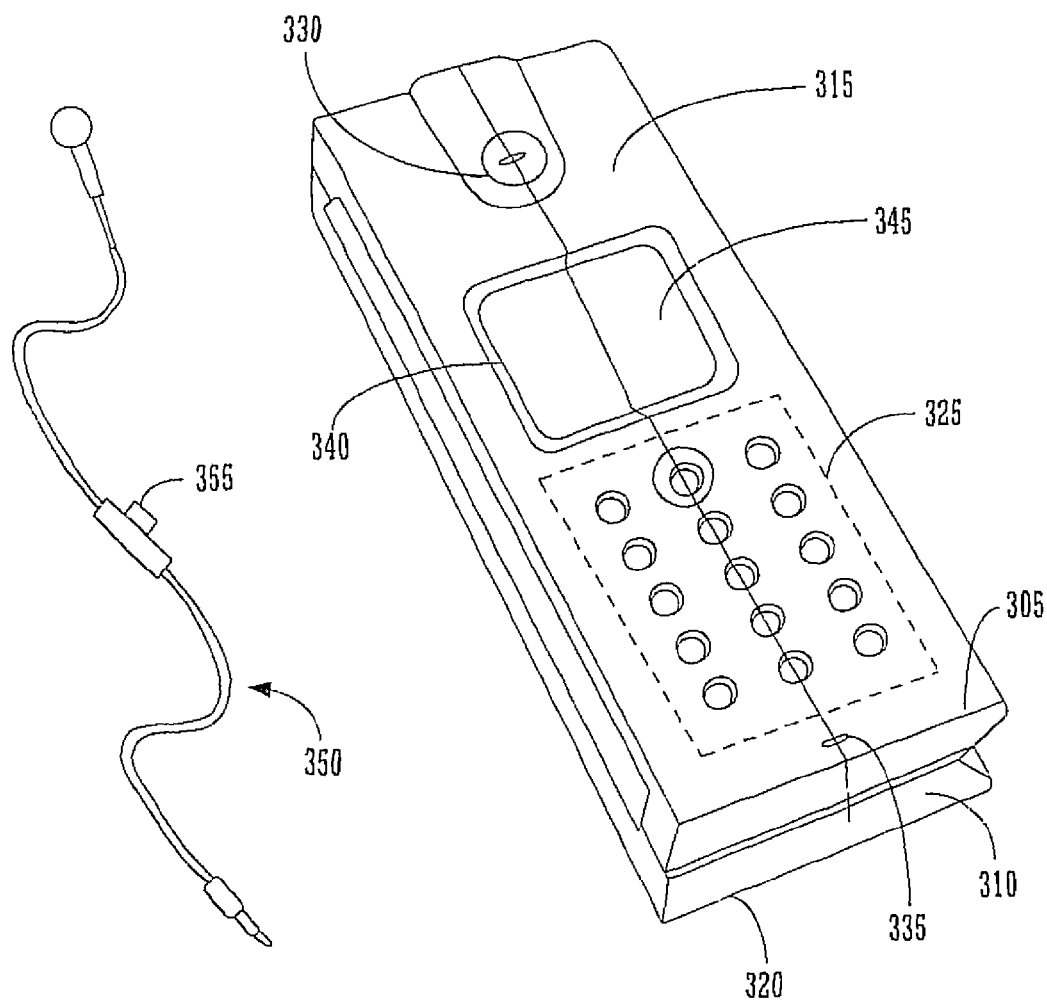
FIG. 3 is a perspective view of a palmtop computer system and cellular telephone with foldable dual-sided display in a first configuration in accordance with an embodiment of the present invention.

FIG. 3 is a perspective view of electronic device 300 (e.g., a palmtop computer system and cellular telephone with foldable dual-sided display) in a first configuration in accordance with one embodiment of the present invention.

Figure 4:
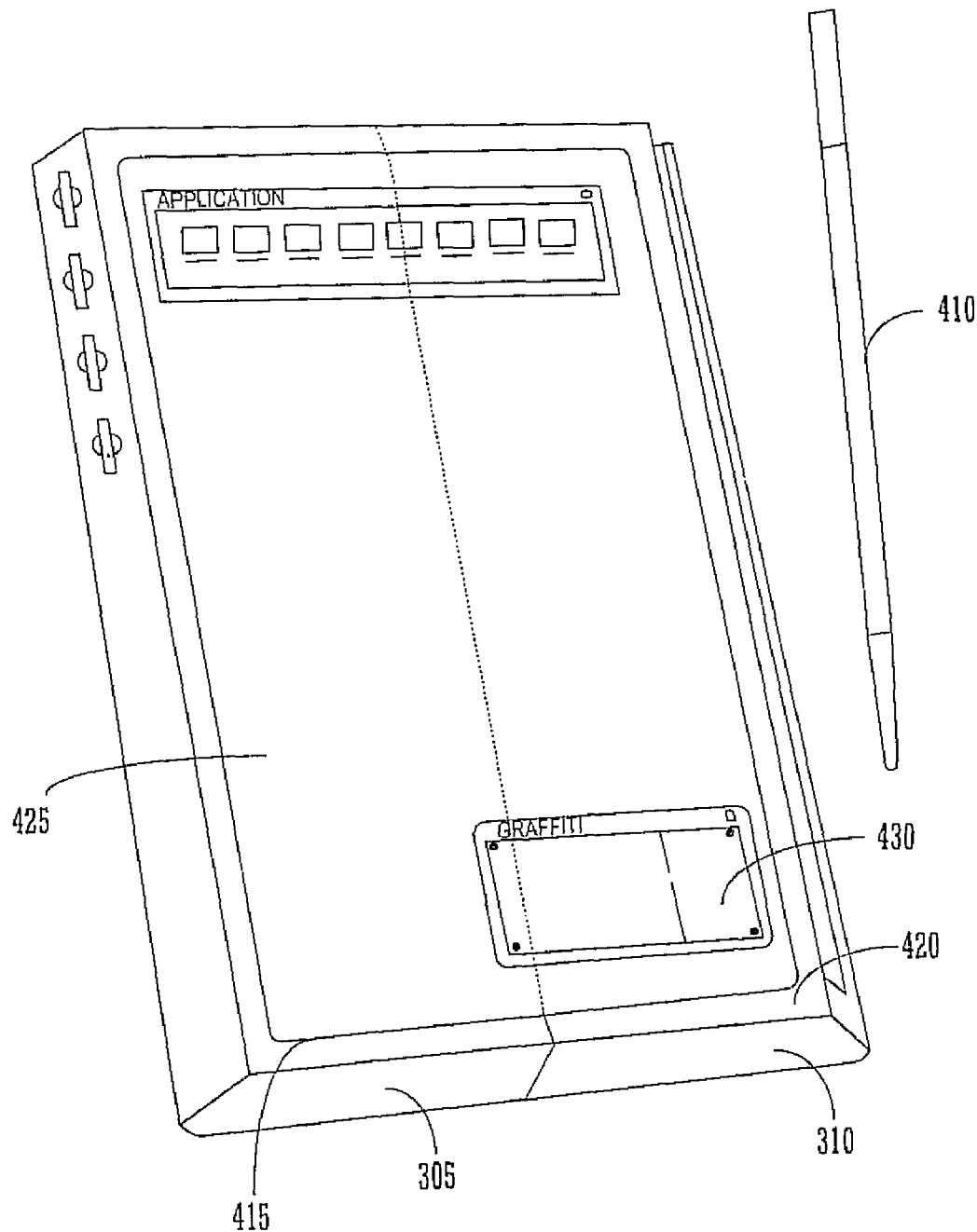
FIG. 4 is a perspective view of a palmtop computer system and cellular telephone with foldable dual-sided display in a second configuration in accordance with an embodiment of the present invention.

In one embodiment, electronic device 300 is comprised of first element 305 and second element 310. First element 305 and second element 310 are movably attached too each other (e.g., hinged). First element 305 is comprised of first side 315 and second side 415 (FIG. 4). Second element 310 is comprised of third side 420 (FIG. 4) and fourth side 320.

In the present embodiment, the first configuration is a closed configuration wherein second side 415 (FIG. 4) and third side 420 (FIG. 4) face each other such that the sides are not user accessible. In the first configuration, first side 315 and fourth side 320 are user accessible allowing for use as a wireless phone.

Still with reference to FIG. 3, first side 315 is comprised of cell phone interface 325. In one embodiment, cell phone interface 325 is comprised of typical numeric keypad associated with cell phones. In another embodiment, cell phone interface 325 is comprised of a numeric keypad and other control elements (e.g., buttons, jog dials). It is essential to appreciate that cell phone interface 325 is intended to include any interface which allows for a user to use cell phone functionality.

First side 315 is also comprised of speaker 330 and microphone 335. Speaker 330 is an audible device that operates to create sound from a wireless transmission that can heard by a user. Microphone 335 operates to receive sound from a user for wireless transmittal.

First side 315 is also comprised of display window 340. In one embodiment, display window 340 is comprised of a clear polyester film, (e.g., Mylar). Display window 340 allows for the viewing of display 345. In one preferred embodiment, display 345 is a flexible dual-sided display. In one embodiment, display 345 implements electronic ink technology.

In one embodiment, display 345 shows call information associated with the use of a cell phone. For example, the call information may include, but is not limited to: the number being called for outgoing calls, when a call is coming in, caller identification of incoming calls, the length in time of a call, names and phone numbers in a phone database stored in the memory of electronic device 300, etc.

In one embodiment, electronic device 300 comprises earbud 350. In one embodiment, earbud 350 allows for a user to operate the wireless phone functionality of electronic device 300 in a hands free manner (e.g. a user can talk and listen without holding the wireless phone to his/her face). Button 355 of earbud 350 allows for a user to operate features of the wireless phone functionality (e.g. receive an incoming call, terminate a call, place a call on hold, place a call off hold).

FIG. 4 is a perspective view of electronic device 300 (e.g., a palmtop computer system and cellular telephone with foldable dual-sided display) in a second configuration in accordance with one embodiment of the present invention.

In one embodiment, electronic device 300 is comprised of first element 305 and second element 310. First element 305 and second element 310 are movably attached too each other. First element 305 is comprised of first side 315 (FIG. 3) and second side 415. Second element 310 is comprised of third side 420 and fourth side 320 (FIG. 3).

In the present embodiment, the second configuration is an open configuration wherein second side 415 and third side 420 are user accessible, allowing for use as a palmtop computer system.

In one embodiment, second side 415 comprises a first part of a display 425 and third side 420 comprises a second part of display 425. In one preferred embodiment, display 425 is comprised of a flexible dual-sided display. Display 425, in the present embodiment (e.g., flexible dual-sided display), is display 345 of FIG. 3 where display 345 is comprised of a flexible dual-sided display. In one embodiment, display 425 implements electronic ink technology.

In one embodiment, display 425 comprises a user interface 430. In one embodiment, user interface 430 comprises a digitizer. In one embodiment, electronic device 300 comprises a stylus 410 for interacting with user interface 430.

The present invention provides a compact palmtop computer system and cellular telephone with foldable dual-sided display. By utilizing flexible display technology, both a palmtop computer system and a cellular telephone are incorporated into one device. In a first configuration, in one embodiment, the present invention corresponds to the form used for typical cellular telephone use (e.g., candy bar size). In second configuration, in one embodiment, the present invention corresponds to the form used for typical palmtop computer system use by providing an enlarged viewing area and a user interface. The present invention provides the benefit of two distinct devices in one device by allowing for common operations and functionality without compromising the respective form factor of either device.

In one embodiment, the present invention automatically switches device functionality upon switching configurations. In one embodiment, cell phone functionality becomes active upon the electronic device being in the first configuration described above (e.g., closed configuration). Alternatively, in another embodiment, palmtop computer system functionality becomes active upon the electronic device being in the second configuration described above (e.g. open configuration).

Figure 5A:
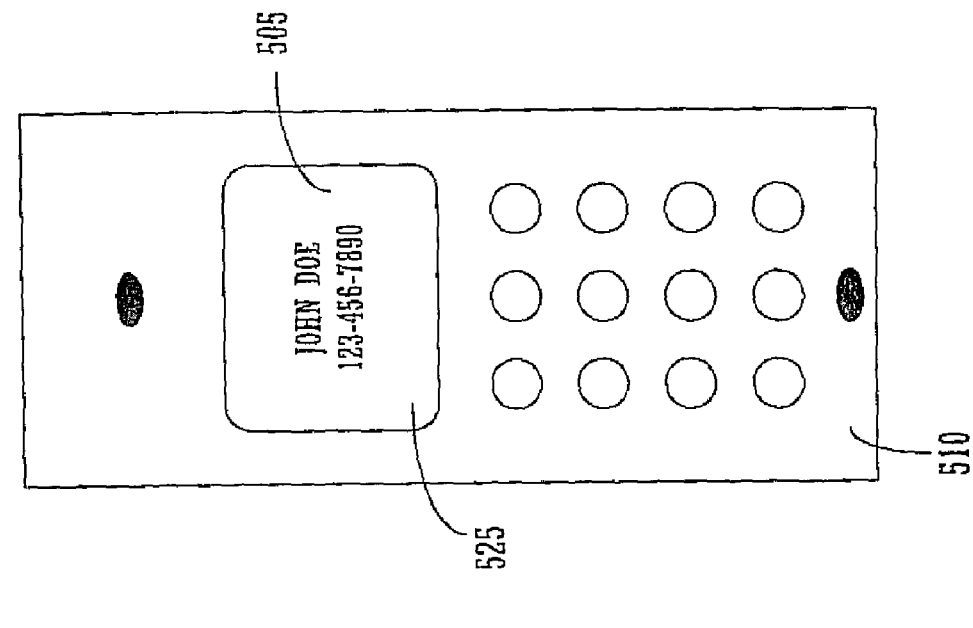
FIG. 5a illustrates an exemplary display of call information in a first configuration of an electronic device in accordance with an embodiment of the present invention.

FIG. 5*a* illustrates an exemplary display of call information 525 in a first configuration of an electronic device 500 in accordance with one embodiment of the present invention. Call information 525 is viewed on display 505 comprising first side 510. In a preferred embodiment, display 505 is a flexible dual-sided display.

In one embodiment of the present invention, as shown in FIG. 5*a*, upon receiving an incoming call, call information 525 is viewed on display 505. As described above, call information 525 can include caller identification. In another embodiment of the present invention, as shown in FIG. 5*a*, upon dialing a number for an outgoing call, call information 525 is viewed on display 505. As described above, call information 525 can include the number dialed or a listing from a phone database.

Figure 5B:
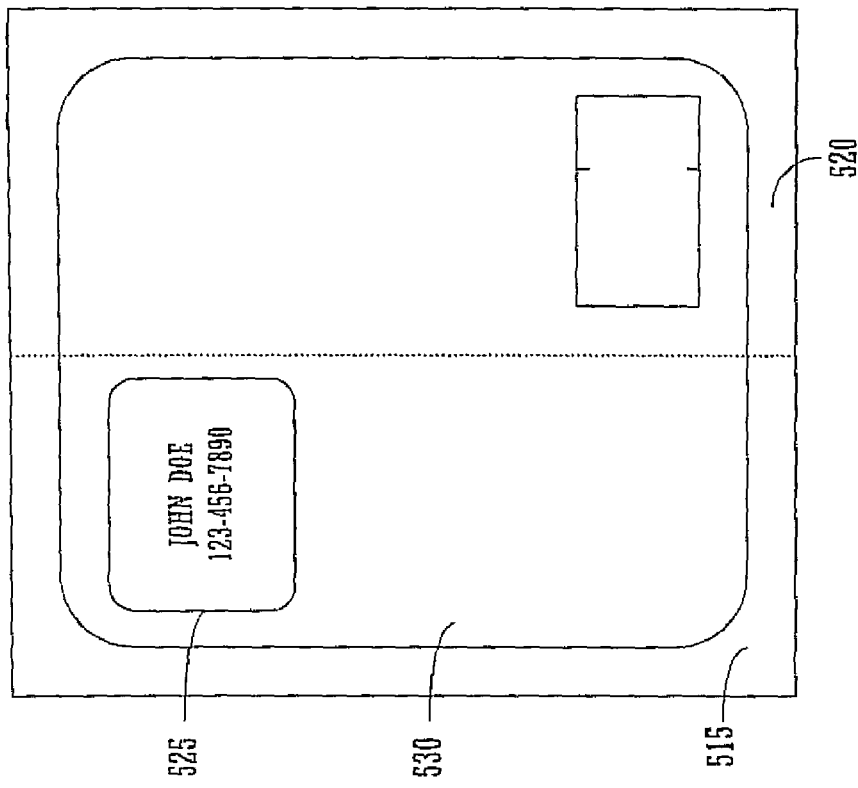
FIG. 5b illustrates an exemplary display of call information in a second configuration of an electronic device in accordance with an embodiment of the present invention.

FIG. 5*b* illustrates an exemplary display of call information 525 in a second configuration of an electronic device 500 in accordance with one embodiment of the present invention. Call information 525 is viewed on display 530 comprising second side 515 and third side 520. In a preferred embodiment, display 530 is a flexible dual-sided display. In one embodiment display 530 is display 505 of FIG. 5*a*.

In one embodiment of the present invention, upon converting electronic device 500 from a first configuration to a second configuration, call information 525 is transferred from display 505 (FIG. 5*a*) to display 530 (FIG. 5*b*). In one embodiment the transfer of call information 525 from display 505 to display 530 is automatic upon the electronic device being converted from a first configuration to a second configuration. The present embodiment permits a user to have direct visual access to a phone number accessed while in the first configuration during use in the second configuration. This allows a user to utilize the palmtop computer system's functionality (e.g., note taking, scheduling, contact list) while having direct visual access to a phone number recently accessed.

Likewise, in one embodiment, call information 525 viewed on display 530 in a second configuration is copied to display 505 upon device being switched from a first configuration to a second configuration. In one embodiment, copying call information from display 530 to display 505 is automatic upon the electronic device being converted from a first configuration to a second configuration.

Figure 6:
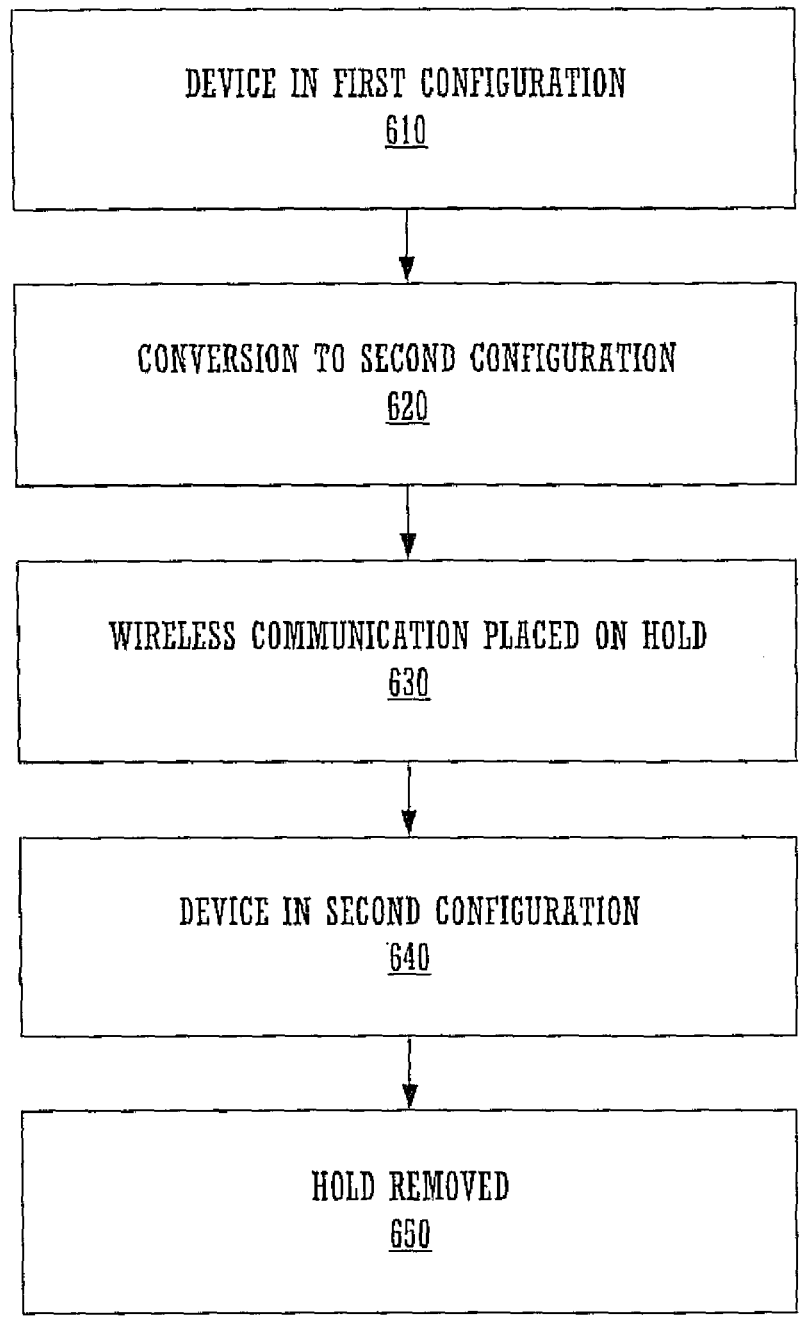
FIG. 6 is a flowchart illustrating steps in a process of placing wireless communications on hold in response to a conversion from a first configuration to a second configuration in accordance with an embodiment of the present invention.

FIG. 6 is a flowchart illustrating steps in a process 600 of placing wireless communications on hold in response to a conversion from a first configuration to a second configuration in accordance with an embodiment of the present invention.

At step 610 of process 600, the electronic device is configured in a first configuration (e.g. first configuration of FIG. 3). In one embodiment, a user is operating the electronic device as a cellular phone.

At step 620, a conversion is performed wherein the electronic device is converted from the first configuration to a second configuration (e.g. second configuration of FIG. 4). For example, a user operating the electronic device as a cellular phone desires to takes notes on the palmtop computer system of the electronic device.

At step 630, the electronic device automatically places wireless communications on hold once the conversion from the first configuration to the second configuration of step 620 is commenced.

At step 640, the electronic device is configured in a second configuration (e.g. second configuration of FIG. 4). In one embodiment, a user is operating the electronic device as a palmtop computer system.

At step 650, the wireless communications are placed off hold. In one embodiment, the wireless communications are placed off hold by a user operating a feature on the electronic device (e.g. activating a button, interacting with user interface 430 of FIG. 4). In another embodiment the wireless communications are placed off hold by a user operating a button on an earbud. In another embodiment, the wireless communications are placed off hold automatically once the electronic device is returned to the first configuration.

FIG. 7*a* illustrates an exemplary display indicating wireless communications are on hold in a second configuration of an electronic device 700 in accordance with an embodiment of the present invention. Hold information 705 is viewed on display 710. Once electronic device 700 is converted from a first configuration to the second configuration (e.g. process 600 of FIG. 6), hold information 705 is displayed.

Figure 7B:
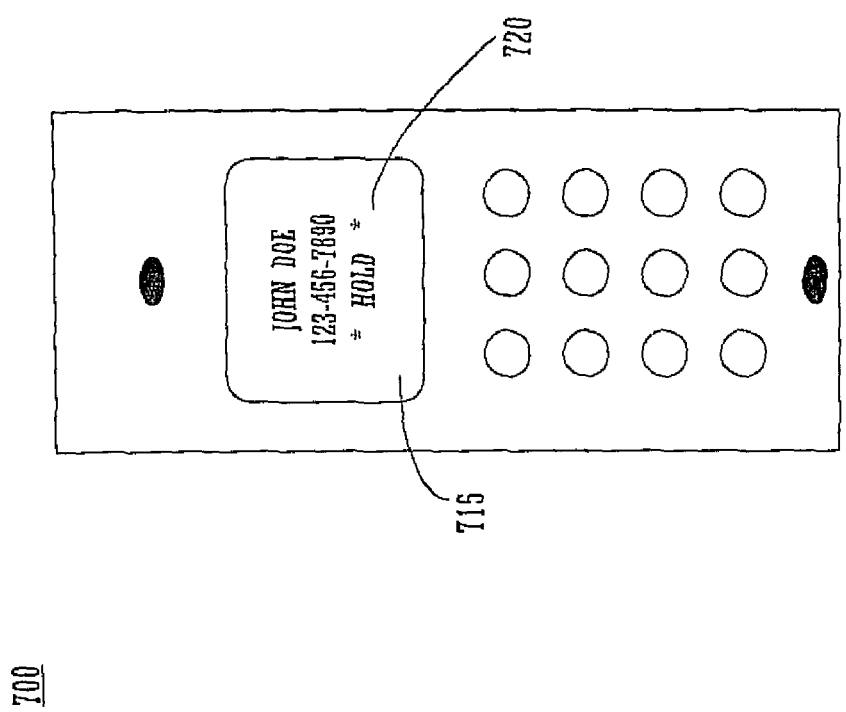
FIG. 7b illustrates an exemplary display indicating wireless communications are on hold in a first configuration of an electronic device in accordance with an embodiment of the present invention.

FIG. 7*b* illustrates an exemplary display indicating wireless communications are on hold in a first configuration of an electronic device 700 in accordance with an embodiment of the present invention. Hold information 715 is viewed on display 720. In one embodiment, once electronic device 700 is converted from the second configuration to the first hold information 715 is displayed.

The preferred embodiment of the present invention, a palmtop computer system and cellular telephone with foldable dual-sided display, is thus described. While the present invention has been described in particular embodiments, it should be appreciated that the present invention should not be construed as limited by such embodiments, but rather construed according to the below claims.

What is claimed is:

1. An electronic device comprising:
   a first housing element comprising a first surface and a second surface opposite said first surface;
   a second housing element movably attached to said first housing element;
   a first display screen mounted on said first surface; and
   a second display screen, larger than the first display screen, mounted on said second surface including a window at least as large as the first display screen, wherein first information displayed on said first display screen is displayable within the window on said second display screen, said first housing element and said second housing element including a closed configuration and an open configuration, wherein said second display screen faces a surface of said second housing element when in the closed configuration and said second display screen is viewable when in the open configuration, said first information is transferred from said first display screen to said second display screen as a result of changing from said closed configuration to said open configuration.

2. The electronic device of claim 1 wherein said second display screen spans said first housing element and said second housing element.

3. The electronic device of claim 1 wherein said first display screen and said second display screen comprise a dual-sided display.

4. The electronic device of claim 1 wherein second information in addition to said first information is displayable on said second display screen simultaneous with said window containing said first information.

5. The electronic device of claim 4 wherein said second information is selected from the group consisting of: notes, schedules, and contacts.

6. The electronic device of claim 1 further comprising telephony hardware to provide wireless voice communication.

7. The electronic device of claim 1 wherein said first information is phone-related information.

8. The electronic device of claim 7 wherein said phone-related information is call information.

9. The electronic device of claim 1 wherein said first display screen and said second display screen are respectively associated with a wireless voice communication device and a handheld computing device that are both integrated within said electronic device.

10. An electronic device comprising:
    a processor;
    a memory unit coupled with said processor;
    electronics coupled with said processor and for wireless communication;
    a first display screen coupled with said processor;
    a second display screen including a window coupled with said processor and larger than said first display screen, the window is at least as large as the first display screen; and
    a foldable housing that houses said processor, said memory unit, said electronics, said first display screen and said second display screen, wherein said first display screen is located on a first surface of said foldable housing and said second display screen located on a second surface of said foldable housing opposite said first surface, wherein first information displayed on said first display screen is viewable within the window on said second display screen, and wherein said first housing element and said second housing element are configurable in a closed configuration in which said second display screen faces a surface of said second housing element, and in an open configuration in which said second display screen is viewable, wherein said first information is transferred from said first display screen to said second display screen as a result of changing from said closed configuration to said open configuration.

11. The electronic device of claim 10 wherein said second display screen spans said first housing element and said second housing element.

12. The electronic device of claim 10 wherein said first display screen and said second display screen comprising a dual-sided display.

13. The electronic device of claim 10, comprising second information displayable on said second display screen simultaneous with said window containing said first information.

14. The electronic device of claim 13 wherein said second information is selected from the group consisting of: notes, schedules, and contacts.

15. The electronic device of claim 10 wherein said first information is phone-related information.

16. The electronic device of claim 15 wherein said phone-related information comprising call information displayed on said first display screen responsive to receiving an incoming call at said electronic device.

17. The electronic device of claim 10 wherein said wireless communication is placed on hold as a result of said changing from said closed configuration to said open configuration.

* * * * *